(12) United States Patent
Yoshida et al.

(10) Patent No.: US 6,378,635 B1
(45) Date of Patent: Apr. 30, 2002

(54) TRACK FRAME CONNECTING STRUCTURE OF A HEAVY WORK VEHICLE

(75) Inventors: Tsuyoshi Yoshida, Katano; Taira Ozaki, Hirakata, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/589,131

(22) Filed: Jun. 8, 2000

(30) Foreign Application Priority Data

Jun. 14, 1999 (JP) ............................................ 11-167209

(51) Int. Cl.$^7$ ........................ B62D 55/06; B62D 55/104
(52) U.S. Cl. ........................................ 180/9.5; 305/134
(58) Field of Search .............................. 180/9.46, 9.5, 180/9.52, 9.54, 9.62, 10, 192, 193; 280/87.042; 305/141, 134, 139

(56) References Cited

U.S. PATENT DOCUMENTS

| | | | | |
|---|---|---|---|---|
| 3,871,462 A | * | 3/1975 | Krolak et al. | 180/9.5 |
| 3,871,467 A | * | 3/1975 | Senft et al. | 180/359 |
| 4,364,443 A | * | 12/1982 | Sato et al. | 180/9.5 |
| 4,582,153 A | * | 4/1986 | Shinsen | 180/9.5 |
| 4,690,231 A | * | 9/1987 | Riml | 180/6.48 |
| 4,781,257 A | * | 11/1988 | Gee et al. | 180/9.5 |
| 4,838,373 A | * | 6/1989 | Price et al. | 180/9.46 |
| 5,279,377 A | * | 1/1994 | Oertley | 180/9.5 |
| 5,368,115 A | * | 11/1994 | Crabb | 180/9.1 |
| 5,762,351 A | * | 6/1998 | SooHoo | 280/267 |

FOREIGN PATENT DOCUMENTS

JP 2132590 11/1990

* cited by examiner

*Primary Examiner*—J. J. Swann
*Assistant Examiner*—David Divine
(74) *Attorney, Agent, or Firm*—Varndell & Varndell, PLLC

(57) ABSTRACT

The present invention provides a track frame connecting structure of a heavy work vehicle that can minimize the amount of up and down movement of the ends of an equalizer bar, so as to make track frames have a sufficiently wide range of straight-line motion for a heavy work vehicle like a tractor. In the track frame connecting structure of a working vehicle in which an equalizer bar which is pivotally mounted on a body is connected to connecting links, the connecting links and the track frames are connected with each other, the connecting links and limiting links are connected with each other, and the links and the body are connected with each other. In addition, the ratio of the distance between an axis S1 of the connecting link 110 and an axis L of the limiting links 120 to the distance between an axis P1 of the equalizer bar 3a and an axis K of the center pin 2 is set substantially equal to the ratio of the distance between an axis Q1 of the connecting link 110 and the axis P1 of the equalizer bar 3a to the distance between the axis of the connecting link Q1 and the axis S1 of the connecting link. The axes Q1, P1, S1 are arranged on a straight line, and the straight line which connects the axes Q1, P1, S1 is set substantially parallel to a body vertical center XX of the body.

2 Claims, 5 Drawing Sheets

TRACK FRAME CONNECTING STRUCTURE OF A HEAVY WORK VEHICLE

BACKGROUND OF THE INVENTION

1. Field of the Invention

This invention relates to a track frame connecting structure of a heavy work vehicle.

2. Description of the Prior Art

Conventionally, as shown in FIG. 5, a body of a tractor that constitutes a heavy vehicle has a pivot shaft 31 secured thereto and track frames 4 are pivotally and tiltably mounted thereon. Crawlers 34, which are guided by rollers 35 and idlers 36, are provided on the track frames 4. Sprockets 33 are fixedly secured to sprocket shafts 32, which are disposed at a position different from the pivot shafts 31. The sprockets 33 transmit power to the crawlers 34. As shown in FIG. 6, an equalizer bar 3 has its center pivotally and tiltably mounted on the body 1 by means of a center pin 2. The equalizer bar 3 has two ends pivotally connected to the track frames 4 by means of pins 37.

Upon receiving an external force from a lateral direction, each track frame 4 has a distal end thereof (left side in the drawing) shifted toward the center of the body (toe-in) or toward the outside of the body (toe-out) around a point M in FIG. 7, which functions as its center. The equalizer bar 3 connects the left and right track frames 4 with the body 1, so as to prevent the toe-in and toe-out which may be caused by this external force. Further, as shown in FIG. 5, when the tractor travels on uneven ground, the track frames 4 tilt up and down following the landform about the pivot axis 31, thus reducing the fluctuation of the body 1.

In the above-mentioned conventional suspension system, as shown in FIG. 6, a pin 37, which connects the equalizer bar 3 and the track frame 4, traces a circular arc having a radius R and its center at center pin 2. When displaced by distance "x", the pin 37 is shifted toward the inside from the initial position by the interval δ1. When this condition is observed from the H direction shown in FIG. 5, the center line KaKa of the track frame 4 takes a position KbKb, which is displaced by δ1 along the center line of the equalizer bar 3 around the center M of the pivot shaft 31, as shown in FIG. 7. In addition, the center of the crawler 34 deviates from the center of the sprocket 33 by δ2 at a position where the crawler 34 is wound around the sprocket 33.

That is, the toe-in gives rise to the distortion of the alignment. Accordingly, there have been problems that non-uniform abrasion occurs at side faces of teeth of the sprockets, side faces of the crawler links, flanges of rollers and bushings of the crawlers, so that the lifetime of these parts is shortened. In addition, an excessive load is applied to the track frame and the pivot shaft frequently, so that the lifetime of these parts is also shortened.

To solve such problems, in Japanese Utility Model Laid-Open Publication 132590/1990, the applicant proposed a suspension system of a crawler type tractor that can reduce the toe-in and the toe-out by providing a crankshaft 10 and a link 20. In this arrangement, a crankshaft and a link shaft are provided where an equalizer bar 3 and a track frame 4 are connected.

This suspension system of the crawler type tractor is shown in FIG. 8 and FIG. 9. FIG. 9 is a cross-sectional view of FIG. 8 taken along a line I—I. In these figures, the equalizer bar 3 is tiltably and pivotally mounted on the body 1 by means of a center pin 2. A pin journal 7 is fitted in a spherical bearing 9, which is mounted in an end portion of the equalizer bar 3. A crankshaft 10 has main journals 8 pivotally mounted in bearings 5, which are welded to the track frame 4. Levers 11 are integrally formed on both ends of the crankshaft 10. End portions of the levers 11 and brackets 22, which are fixedly secured to the frame 1, are connected by way of link pins 21 and links 20. The link pins 21 and links 20 are fixedly secured to each other. The link pins 21 and levers 11 are rotatably connected with each other, and the link pins 21 and the brackets 22 are also rotatably connected with each other.

The manner of operation of the above suspension system will now be explained. As shown in FIG. 10, the crank shaft 10 is pivotally mounted in the portion of equalizer bar 3. With the lifting of an axis Q of the bearing 5 that is brought about by the lifting of the track frame 4, an axis P of the pin journal 7 of the crank shaft 10 moves on a circular arc BB which has its center at the center pin 2. A center S of the link pins 21, which are provided at the end portions of the levers 11, moves on a circular arc CC. The levers 11 are pivotally mounted on the brackets 22 of the body 1. Accordingly, the position of the motion of the axis Q is restricted, and the motion approximates a straight line AA so that the amount of the toe-in takes the least value. Although not shown in the drawings, the similar effect is obtained in lowering the track frame 4. Accordingly, even when the track frame 4 is jolted at the time that the tractor travels on an uneven ground, an amount of toe-in caused by the equalizer bar 3 can be minimized.

However, the above-mentioned suspension system of the crawler type tractor has the following problems.

As shown in FIG. 8 and FIG. 9, the pin journals 7 provided at the end portions of the equalizer bar 3 are disposed at the outside of body 1 in the left and right directions, while the main journals 8, which are pivotally mounted on bearings 5 welded to the track frame 4, are disposed close to the center of the body 1 in the left and right directions. That is, the pin journals 7 and the main journals 8 are arranged in the left and right directions of the body. Compared to the main journals 8, which are pivotally mounted on the bearing 5 welded to the track frame 4, the pin journals 7 provided at the end portions of the equalizer bar 3 are disposed at positions further from the center pin 2. Therefore, in order to assure a necessary amount of movement of the track frame 4 in the up and down directions, it becomes necessary to have an amount of movement of the end portions of the equalizer bar 3 in the up and down directions, which is equal to or greater than the amount of movement of the track frame 4. Accordingly, it is necessary for there to be a space in the body 1, which allows such a motion of the equalizer bar 3. To this end, the center pin 2, which mounts the equalizer bar 3 to the body 1 so that the body freely tilts and pivots, must be lowered and a bracket portion 1b of the body 1, to which the center pin 2 is mounted, must be enlarged in the downward direction. The result is that the weight of the vehicle is increased and waste materials are increased, thus increasing the cost.

Further, as mentioned previously, if the track frame 4 is lifted, the axis Q of the bearing 5 has its range of motion thereof restricted and the motion substantially approximates the straight line AA. However, as mentioned previously, because the pin journals 7 are fitted in the end portions of the equalizer bar 3, the main journals 8 are pivotally mounted on the bearings 5 welded to the track frame 4 at positions toward the center of the body 1, and the axis P of the pin journal 7. Also, the axis Q of the bearing 5 and the center S of link pins 21 are arranged in the horizontal direction as shown in FIG. 8. Thus, the range of motion for the axis Q of the bearings 5 is a straight-line motion and narrow, and the range is insufficient to provide the straight-line motion in a manner necessary for a heavy work vehicle like a tractor.

SUMMARY OF THE INVENTION

The present invention was made to solve the above-mentioned problems. It is an object of the present invention to provide a track frame connecting structure of a working vehicle that can minimize the up and down movement of end portions of an equalizer bar, so that the range of the straight-line motion of the track frames is, for practical purposes, sufficient for a working vehicle like a tractor.

To achieve the above-mentioned object, a first aspect of the present invention is directed to a track frame connecting structure of a working vehicle, in which an equalizer bar is pivotally and tiltably mounted on a body by a center pin and has both end portions thereof respectively rotatably connected to connecting links. The connecting links and the track frames are rotatably connected with each other, the connecting links and one end of the limiting links are rotatably connected with each other, and the other end of the limiting links and the body are rotatably connected with each other.

LS1 is the distance between a link connecting axis S1 of the connecting link and the limiting link and a body connecting axis L connecting the limiting link and the body. The equalizer bar axis distance KP1 is the distance between an equalizer bar connecting axis P1, connecting the equalizer bar and the connecting link and the center pin axis K of the center pin. The link/equalizer bar ratio LS1/KP1 is set equal to or substantially equal to the connecting link ratio P1Q1/S1Q1. The track frame connecting distance P1Q1 is the distance between the track frame connecting axis Q1, which connects the connecting link and the track frame and the equalizer bar connecting axis P1 of the equalizer bar and the connecting link. The connecting link axis distance S1Q1 is the distance between a track frame connecting axis Q1, which connects the connecting link and the track frame, and a link connecting axis S1, which connects the connecting link and the limiting link.

The track frame connecting axis Q1, and the equalizer bar connecting axis P1 and the limiting link connecting axis S1 are arranged on a straight line. This straight line is set parallel to or substantially parallel to a body vertical center XX of the body.

According to the first aspect of the present invention, the motion of the track frame connecting axis Q1 of the track frame becomes the motion on a straight line SL of a locus shown by a dotted line in FIG. 3, due to the mechanism that sets the ratio between respective axes that are connected in the above manner to LS1/KP1=P1Q1/S1Q1. Accordingly, the motion shown by a line A1A1 that connects the track frame connecting axis Q1 (shown in FIG. 4), an axis Q10, which indicates the position of the track frame connecting axis Q1 at the time that the equalizer bar is not displaced, and axis Q12, which indicates the position of the track frame connecting axis Q1 when the track frame is lowered, is the Watt's approximate straight-line motion (discussed later). Therefore, the track frame connecting axis Q1 moves while approximating a straight line A1A1. Further, the range within which the track frame connecting axis Q1 performs the approximate straight-line motion is sufficiently wide in practical use compared to the range obtained by the conventional suspension system of the crawler type tractor, which is proposed in Japanese Utility Model Laid-Open Publication 132590/1990. Accordingly, in both lifting and lowering of the track frame, an amount of toe-in becomes an extremely small value. Hence, the amount of toe-in, which may be generated by the equalizer bar when the track frame is tilted at the time that the heavy work vehicle travels on uneven ground, can be reduced to a sufficiently low value for practical purposes.

Eventually, the distortion of the alignment becomes extremely small, so that the lifetime of side faces of teeth of sprockets, side faces of crawler links of crawlers, flanges of rollers, bushings of the crawlers and the like is prolonged. Further, since no excessive load is applied to the track frames and a pivot shaft, the lifetime of the track frames and the pivot shaft can be prolonged.

According to a second aspect of the present invention, in a variation of the first aspect of the present invention, one of the longitudinal end portions of each of the connecting links are connected to the track frames. The other longitudinal end portions of the connecting links are connected to the limiting links, and both ends of the equalizer bar are connected to the connecting links at positions which are disposed between connecting portions. One of the longitudinal end portions of each of the connecting links is connected to the track frames and connecting portions where the other longitudinal end portions of the connecting links are connected to the limiting links.

Due to the second aspect of the present invention, in addition to the effect of the first aspect of the present invention, since the end portions of the equalizer bar and the bearings of the track frames are arranged at positions where they overlap vertically, the spaces in the left and right directions defined between the body and the equalizer bar and the tractor frame can be made small. Thus, the suspension system can be made compact in size, can be reduced in weight thereof, and can be reduced in manufacturing cost.

Further, the end portions of the equalizer bar and the bearings of the track frames are arranged at positions where they overlap vertically. This assures that the necessary amount of movement of the track frames in the vertical direction is achieved, compared to the conventional suspension system of the crawler type tractor proposed by Japanese Utility Model Laid-Open Publication 132590/1990. Thus, the amount of tilting of the equalizer bar is reduced so that it is no longer necessary to extend the bracket portion of the body to which the center pin is mounted downward, and hence the bracket portion can be made small, resulting in the reduction of both the weight of the vehicle and the manufacturing cost.

These objects and advantages of this invention will become further apparent from the following detailed explanation.

DETAILED DESCRIPTION OF THE PREFERRED EMBODIMENT

Embodiment of the present invention is explained hereinafter in conjunction with attached drawings. Parts that are described in the prior art are denoted by same symbol and their explanations are omitted.

Figure 1:
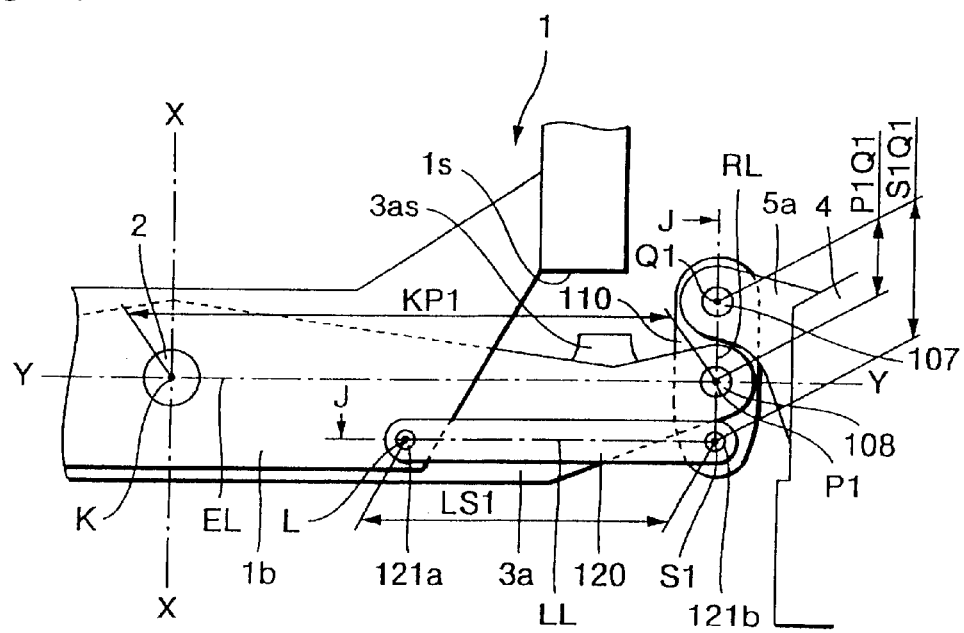
FIG. 1 is a front view showing an embodiment of the present invention.
Figure 2:
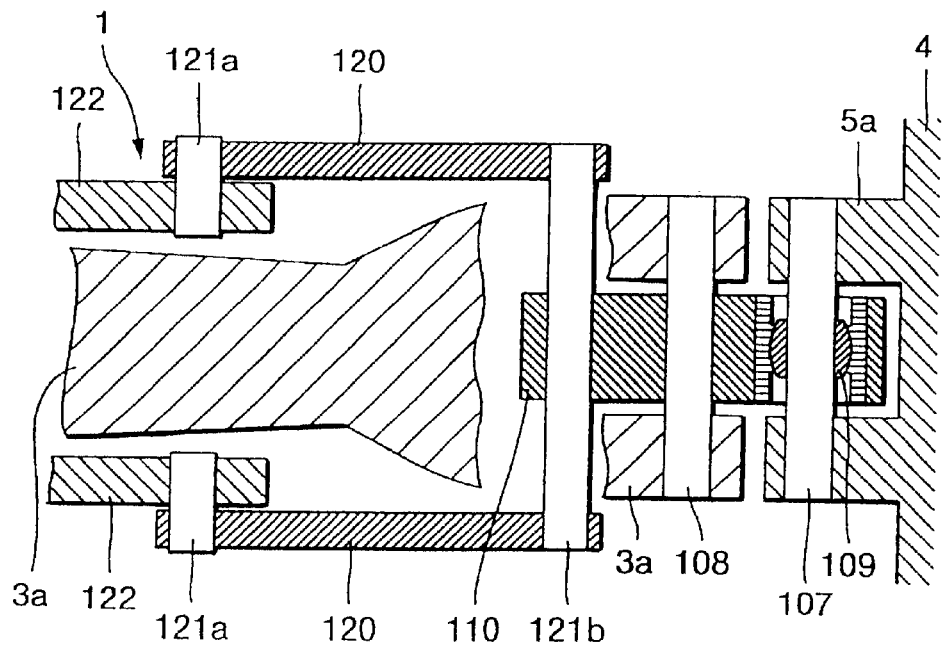
FIG. 2 is a cross-sectional view showing the embodiment of the present invention.

The embodiment is explained in conjunction with FIG. 1 and FIG. 2. FIG. 2 is a cross-sectional view taken along a line J—J of FIG. 1.

As shown in FIG. 1, a heavy work vehicle is on a horizontal ground and is held in a condition that track frames 4 are not displaced relative to the body 1. An equalizer bar 3a is tiltably and pivotally mounted on the body 1 by means of a center pin 2. End portions of the equalizer bar 3a, which are respectively bifurcated, are connected tiltably to longitudinally intermediate portions or portions close to the central portions of connecting links 110 by means of connecting pins 108. The equalizer bar 3a is provided with stoppers 3as, which are brought into contact with lower surface portions is of the body 1 when the equalizer bar 3a is tilted so as to restrict the tilting of the equalizer bar 3a.

Bearings 5a are welded to inner upper portions of the track frames 4 to the left and right of the body 1. One of the longitudinal end portions of each of the connecting links 110. The bearings 5a are tiltably connected with each other by fitting connecting link pins 107 into spherical bearings 109 that are mounted in the aforesaid longitudinal end portions of the connecting links 110. The other longitudinal end portions of the connecting links 110 and the brackets 122, which are fixedly secured to the body 1, are connected by way of body-side link pins 121a, limiting links 120 and link pins 121b. The body-side link pins 121a and the link pins 121b are fixedly secured to the limiting links 120, while the link pins 121b and the connecting links 110 are rotatably connected with each other. The body-side link pins 121a and the brackets 122 are also rotatably connected with each other. In FIG. 1, the connecting links 110 are mounted such that their longitudinal direction is arranged approximately parallel to the body vertical center line XX of the body 1 by selecting an appropriate length and mounting position for the limiting links 120.

The link axis distance LS1 is a distance between a body connecting axis L of the body-side link pin 121a and a link connecting axis S1 of the link pin 121b. The equalizer bar axis distance KP1 is a distance between a center pin axis K of the center pin 2 and an equalizer bar connecting axis P1 of the connecting pin 108. It is preferable that the link/equalizer bar ratio LS1/KP1 is set equal to the connecting link ratio P1Q1/S1Q1. The track frame connecting distance P1Q1 is the distance between the equalizer bar connecting axis P1 of the connecting pin 108 and a track frame connecting axis Q1 of the connecting link pin 107. The connecting link axis distance S1Q1 is the distance between a link connecting axis S1 of the link pin 121b and a track frame connecting axis Q1 of the connecting link pin 107. It is preferred that LS1/KP1=P1Q1/S1Q1.

Figure 3:
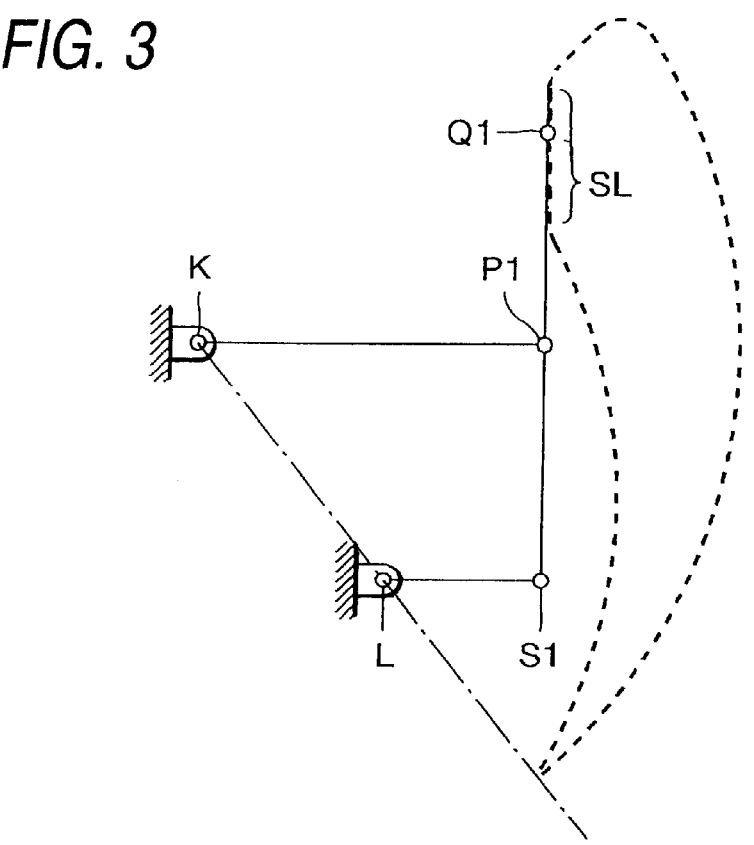
FIG. 3 is an explanatory view showing the manner of operation of the embodiment of the present invention.

In this manner, by the use of the mechanism that sets the ratio of distances among respective axes that are connected with each other to the above-mentioned LS1/KP1=P1Q1/S1Q1, the track frame connecting axis Q1 draws a locus shown by a dotted line in FIG. 3. This embodiment makes use of a straight-line portion SL of this locus that is generally called the Watt's approximate straight-line motion. Due to such a mechanism, compared to the suspension system of the crawler type tractor proposed by Japanese Utility Model Laid-Open Publication 132590/1990, the range where the motion of the track frame connecting axis Q1 of the connecting link pins 107, which are fitted into the bearings 5a welded to the track frames 4, becomes a straight-line motion that can be widened sufficiently for practical use.

It is desirable that the track frame connecting axis Q1 of the connecting link pin 107, the equalizer bar connecting axis P1 of the connecting pin 108, and the link connecting axis S1 of the link pin 121b are on a straight line. Further, it is desirable that a line RL; which connects the track frame connecting axis Q1 of the connecting link pin 107, the equalizer bar connecting axis P1 of the connecting pin 108, and the link connecting axis S1 of the link pin 121b; is parallel to a body vertical center line XX of the body 1.

Further, it is desirable that a straight line LL, which connects the body connecting axis L of the body-side link pin 121a and the link connecting axis S1 of the link pin 121b, is parallel to a straight line EL that connects the center pin axis K of the center pin 2 and the equalizer bar connecting axis P1 of the connecting pin 108. Further, it is desirable that a straight line RL; which connects the track frame connecting axis Q1 of the connecting link pin 107, the equalizer bar connecting axis P1 of the connecting pin 108, and the link connecting axis S1 of the link pin 121b; is perpendicular to the straight line LL.

In case the track frame 4 is not displaced, it is desirable that the straight line EL, which connects the center pin axis K of the center pin 2 and the equalizer bar connecting axis P1 of the connecting pin 108, overlaps with the body horizontal center axis line YY of the body 1 that passes through the center pin axis K of the center pin 2.

Although the relationship between the link/equalizer bar ratio LS1/KP1 and the connecting link ratio P1Q1/S1Q1 is set to LS1/KP1=P1Q1/S1Q1, the link/equalizer bar ratio LS1/KP1 can be approximately equal to the connecting link ratio P1Q1/S1Q1 provided that no problem occurs in practical use.

Figure 4:
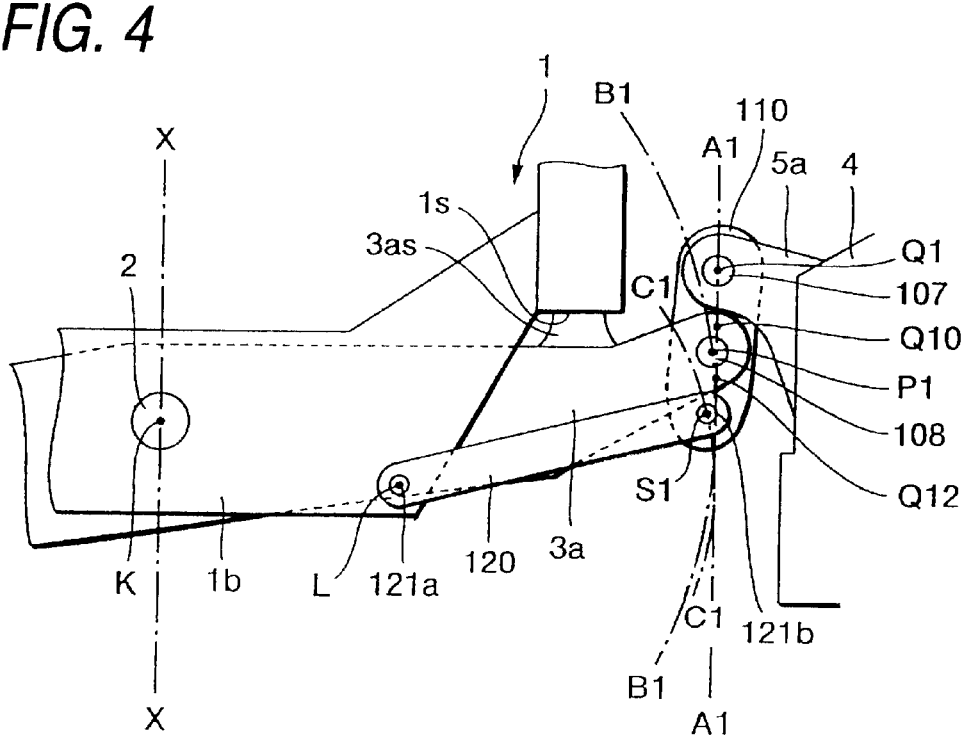
FIG. 4 is an explanatory view showing the manner of operation of the embodiment of the present invention.
Figure 5:
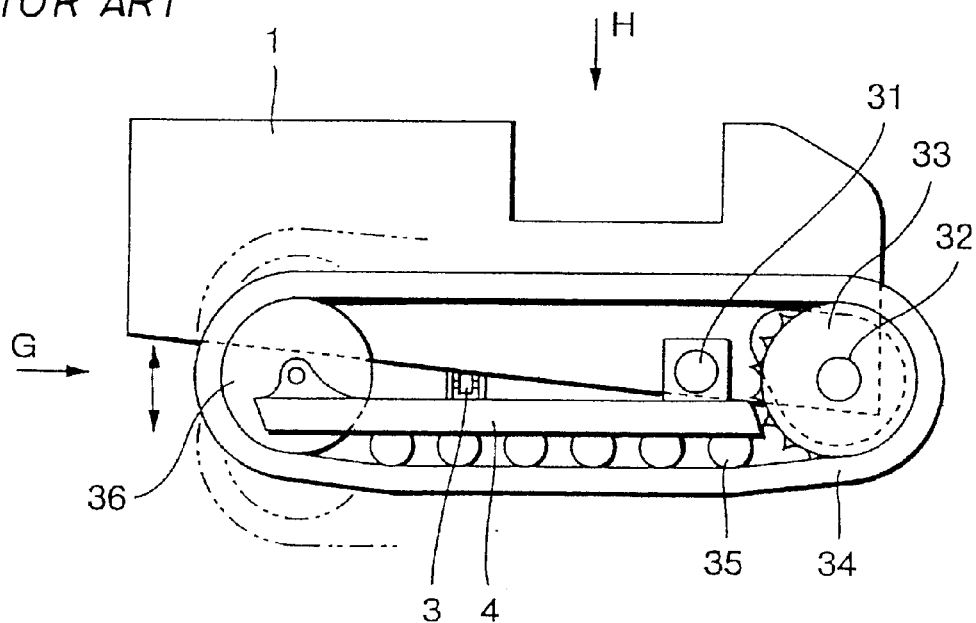
FIG. 5 is a side view showing the entire structure of a heavy work vehicle.
Figure 6:
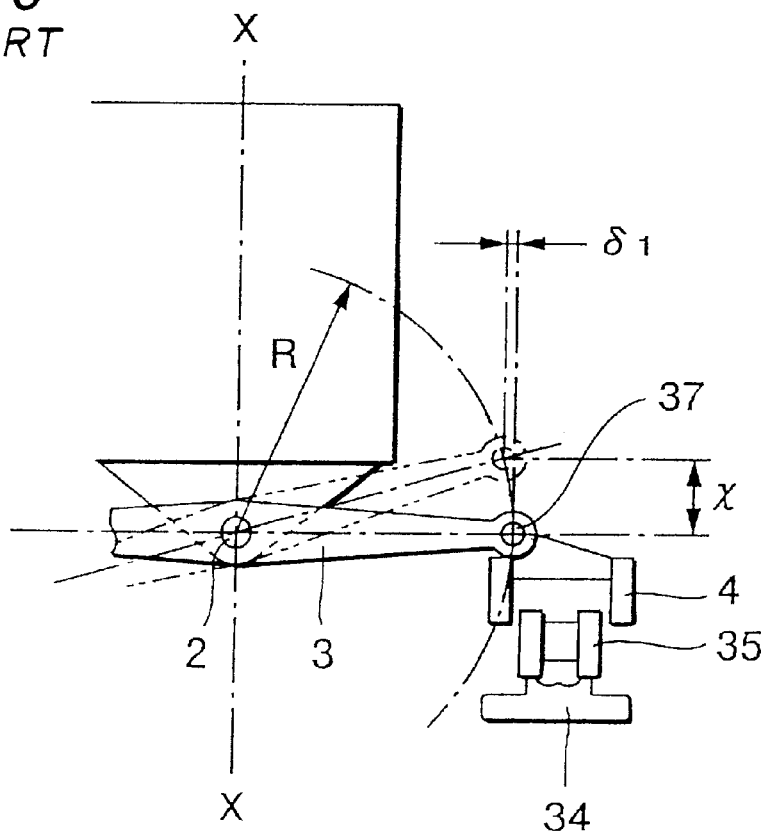
FIG. 6 is a front view as seen from a position G in FIG. 5.
Figure 7:
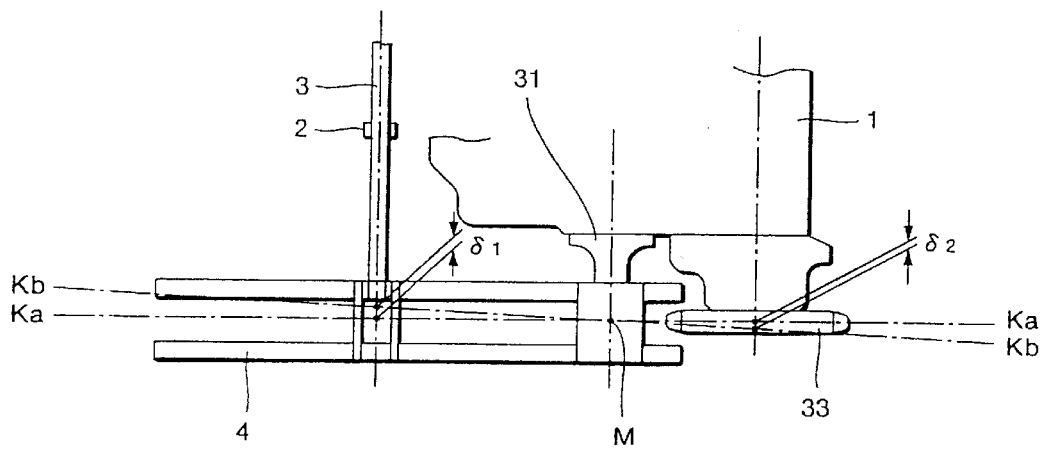
FIG. 7 is a plane view as seen from a position H in FIG. 5.
Figure 8:
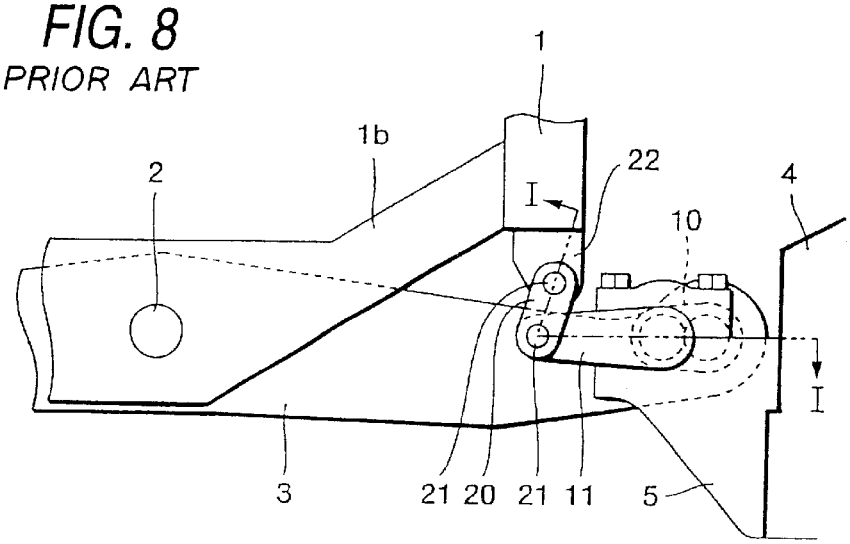
FIG. 8 is a front view of a conventional suspension system of a crawler type tractor.
Figure 9:
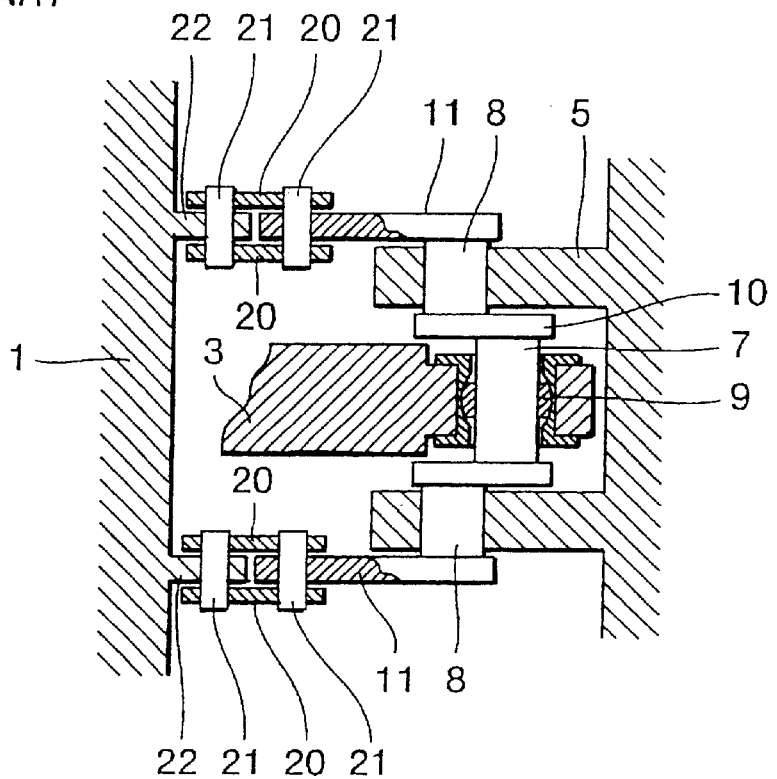
FIG. 9 is a cross-sectional view of a conventional suspension system of a crawler type tractor.
Figure 10:
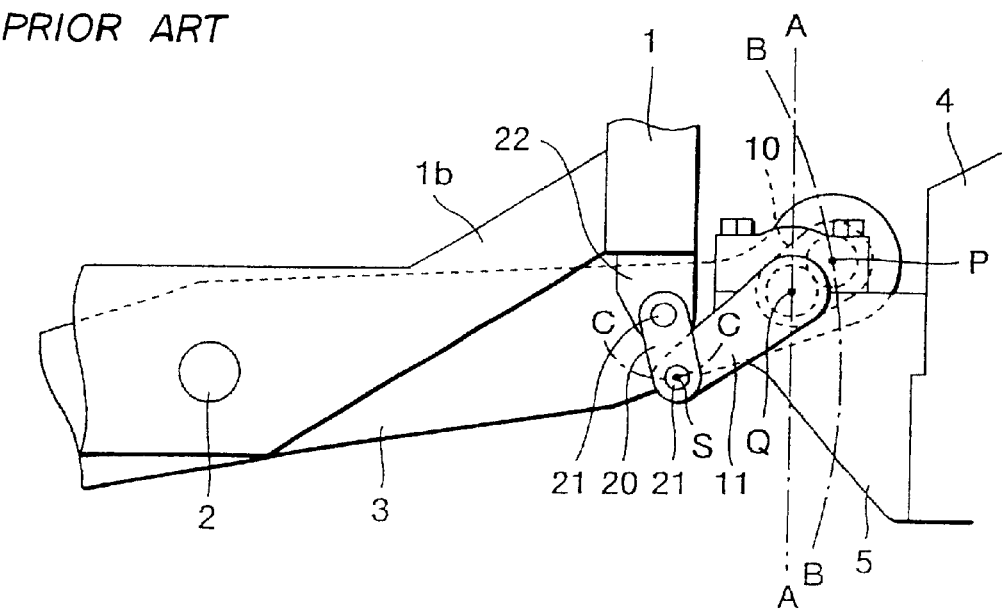
FIG. 10 is an explanatory view showing the manner of operation of the conventional suspension system of a crawler type tractor.

Subsequently, the manner of operation is explained. As shown in FIG. 4, when the track frame 4 is lifted and in response the track frame connecting axis Q1 of the bearing 5a is lifted, the equalizer bar 3a is tilted and the stopper 3a is brought into contact with the lower surface portion is of the body 1, so that the tilting of the equalizer bar 3a is restricted. In this case, the equalizer bar connecting axis P1 of the connecting pin 108 of the connecting link 110, which is pivotally mounted on the end portion of the equalizer bar 3a, moves on a circular arc B1B1 that has its center at the center pin axis K of the center pin 2. The center S1 of the link pin 121b disposed at the other longitudinal end portion of the connecting link 110 moves on a circular arc C1C1, which has its center at the body connecting axis L of the body-side link pin 121a. The body-side link pin 121a is pivotally mounted on the bracket 122 of the body 1.

As a result, due to the mechanism that sets the ratio of distances among axes which are connected in the above mentioned manner to LS1/KP1=P1Q1/S1Q1, the motion of the track frame connecting axis Q1 takes a motion on a straight line SL of a locus that is shown by a dotted line in FIG. 3. Accordingly, the motion designated by a line A1A1 that connects the track frame connecting axis Q1 (shown in FIG. 4), the axis Q10, which indicates the position of the track frame connecting axis Q1 when the equalizer bar 3a is not displaced, and the axis Q12, which indicates the position of the track frame connecting axis Q1 when the track frame 4 is lowered, approximates the above-mentioned Watt's approximate straight-line motion. Therefore, the track frame connecting axis Q1 moves approximating the straight line A1A1. Further, the range within which the track frame connecting axis Q1 performs the approximate straight-line motion is sufficiently wide for practical use, in contrast with the suspension system of the crawler type tractor proposed by Japanese Utility Model Laid-Open Publication 132590/1990. Accordingly, in both lifting and lowering of the tractor frames 4, an amount of toe-in can be reduced to an extremely small value, so that an amount of toe-in caused by the equalizer bar 3a when the tractor frame is tilted, when the tractor travels on the uneven ground can be reduced to a sufficiently small value in practical use.

Eventually, the distortion of the alignment becomes extremely small in amount, so that the lifetime of side faces of teeth of the sprockets 33, side faces of crawler links of a crawler 34, flanges of rollers 35, bushings of the crawlers 34 and the like is prolonged. Further, since no excessive load is applied to the track frames 4 and a pivot shaft 31, the lifetime of the track frames 4 and the pivot shaft 31 can be prolonged.

Since the end portions of the equalizer bar 3a and the bearings 5a of the track frames 4 are arranged at positions where they overlap vertically, the space between the equalizer bar 3a and the tractor frames 4 in the left-right direction of the body 1 can be made small. Therefore, the suspension system of the track frames 4 can be made compact in size, can be reduced in weight thereof, and can be reduced in manufacturing cost.

Further, since the end portions of the equalizer bar 3a and the bearings 5a of the track frames 4 are arranged at positions where they overlap vertically. This assures that the necessary amount of movement of the track frames 4 in the vertical direction is achieved, in contrast to the conventional suspension system of the crawler type tractor proposed by the Japanese Utility Model Laid-Open Publication 132590/1990. In addition, the amount of tilting of the equalizer bar 3a can be made small so that it is no longer necessary to extend the bracket portion 1b of the body 1 to which the center pin 2 is mounted downward. Therefore, the bracket portion 1b can be made small in size resulting in the reduction of both the weight of the vehicle and the manufacturing cost.

The straight line RL connects the track frame connecting axis Q1 of the connecting link pin 107, the equalizer bar connecting axis P1 of the connecting pin 108, and the link connecting axis S1 of the link pin 121b. The track frame connecting axis Q1 of the connecting link pin 107, the equalizer bar connecting axis P1 of the connecting pin 108, and the link connecting axis S1 of the link pin 121b are arranged on a straight line. This straight line and the straight line RL are set parallel to the body vertical center line XX of the body 1. Further, the straight line LL, which connects the body connecting axis L of the body-side link pin 121a and the link connecting axis S1 of the link pin 121b, is made parallel to the straight line EL. The straight line EL connects the center pin axis K of the center pin 2 and the equalizer bar connecting axis P1 of the connecting pin 108. Further, in case the track frame 4 is not displaced, the straight line EL coincides with the body horizontal center line YY of the body 1, which passes through the center pin axis K of the center pin 2.

Due to such a constitution, the motion of the above-mentioned track frame connecting axis Q1 becomes the motion that moves parallel to the body vertical center line XX of the body 1. Accordingly, the track frame 4 moves approximately parallel to the body vertical center line XX of the body 1, so that the toe-in can be reduced to an extremely small value and the distortion of the alignment can also be reduced to an extremely small value. Therefore, the lifetime of side faces of teeth of the sprockets 33, side faces of crawler links of the crawlers 34, flanges of rollers 35, bushings of the crawler 34, and the like, is prolonged. Further, since no excessive load is applied to the track frames 4 and the pivot shaft 31, the lifetime of the track frames 4 and the pivot shaft 31 can be prolonged.

What is claimed is:

1. A connecting structure for connecting track frames of a work vehicle in which an equalizer bar which is pivotally and tiltably mounted on a body by a center pin has both end portions thereof respectively rotatably connected to connecting links, the connecting links and the track frames are rotatably connected with each other, the connecting links and one end portion of limiting links are rotatably connected with each other, and other end portions of the limiting links are rotatably connected to the body, wherein the link/equalizer bar ratio LS1/KP1 which is the ratio of a link axis distance LS1 which is the distance between a link connecting axis S1 of the connecting link and the limiting link and a body connecting axis L connecting the limiting link and the body, to an equalizer bar axis distance KP1 which is the distance between an equalizer bar connecting axis P1 connecting the equalizer bar and the connecting link and a center pin axis K of the center pin is set equal to or substantially equal to the connecting link ratio P1Q1/S1Q1 which is the ratio of the track frame connecting distance P1Q1 between a track frame connecting axis Q1 connecting the connecting link and the track frame and the equalizer bar connecting axis P1 of the equalizer bar and the connecting link, and the connecting link axis distance S1Q1 which is the distance between a respective track frame connecting axis Q1 connecting the connecting link and the respective track frame, and a link connecting axis S1 of the connecting link and the limiting link, the respective track frame connecting axis Q1, the equalizer bar connecting axis P1 and the link connecting axis S1 are arranged on a straight line, and the straight line which connects the respective track frame connecting axis Q1, the equalizer bar connecting axis P1 and the link connecting axis S1 is set parallel to or substantially parallel to a body vertical center XX of the body.

2. A connecting structure for connecting track frames of a heavy work vehicle according to claim 1, wherein one of the longitudinal end portions of each of the connecting links are connected to the track frames, the other longitudinal end portions of the connecting links are connected to the limiting links, and both ends of the equalizer bar are connected to the connecting links at positions which are disposed between the said two connecting portions.

* * * * *